Figure 1:
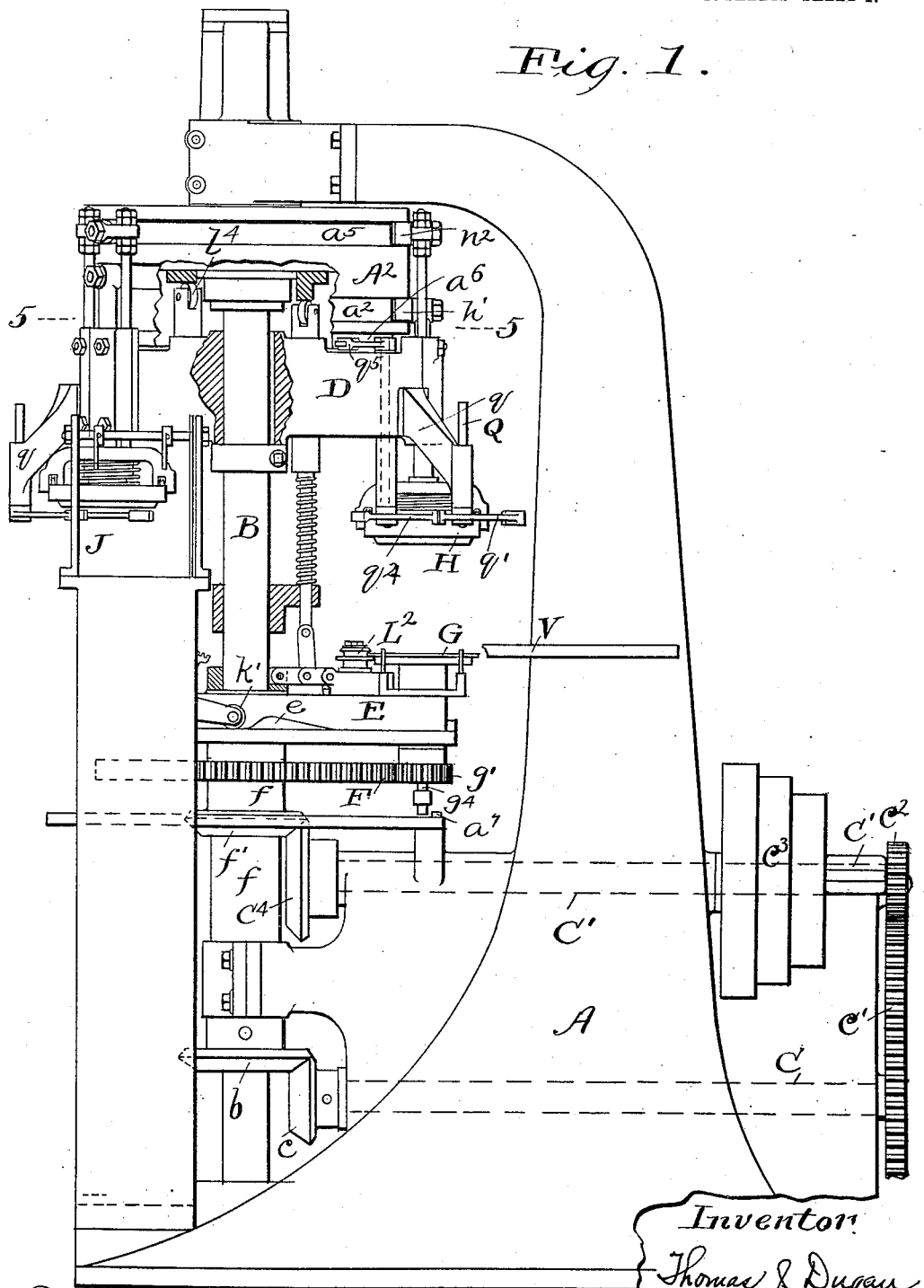

No. 848,296. PATENTED MAR. 26, 1907.
T. J. DUGAN.
CAN MAKING MACHINE.
APPLICATION FILED AUG. 14, 1905.

10 SHEETS—SHEET 8.

Witnesses.
E. B. Gilchrist
J. M. Woodward

Inventor
Thomas J. Dugan,
By his Attorneys
Thurston & Bates.

No. 848,296. PATENTED MAR. 26, 1907.
T. J. DUGAN.
CAN MAKING MACHINE.
APPLICATION FILED AUG. 14, 1905.

10 SHEETS—SHEET 10.

Witnesses
E. B. Gilchrist
J. M. Goodwood

Inventor
Thomas J. Dugan
By his Attorneys,
Thurston & Bates

UNITED STATES PATENT OFFICE.

THOMAS J. DUGAN, OF CLEVELAND, OHIO, ASSIGNOR TO MARTIN J. O. DONNELL, OF CLEVELAND, OHIO.

CAN-MAKING MACHINE.

No. 848,296.　　　　Specification of Letters Patent.　　　Patented March 26, 1907.

Application filed August 14, 1905. Serial No. 274,038.

*To all whom it may concern:*

Be it known that I, THOMAS J. DUGAN, a citizen of the United States, residing at Cleveland, in the county of Cuyahoga and State of Ohio, have invented a certain new and useful Improvement in Can-Making Machines, of which the following is a full, clear, and exact description, reference being had to the accompanying drawings.

The object of this invention is to provide an efficient automatic machine for rapidly attaching the bottoms to can-bodies, curling the upper edge of the body, and placing the covers on the cans thus completed. The can-bodies, the bottoms, and the covers may be fed to the machine continuously by gravity and the completed and covered cans automatically delivered.

The invention resides in the means and combination of mechanisms employed to attain the above objects, as more fully hereinafter explained and as definitely set out in the claims.

A preferred form of the machine, to be more fully hereinafter described, receives can-bodies and bottoms rolling toward it in separate chutes. A pair of stops are provided, alternately entering these chutes to discharge a can body and bottom at a time into the machine. The can body and bottom leaving the chute enter a receiving member, which turns them upward through a quarter of a rotation to bring the bottom horizontal and the can-body resting thereon. In this position the body and bottom are engaged by a pair of traveling pins and shoved out of the receiving member onto a rotating chuck. A plunger then descends on the can-body and holds it with the bottom in place. Rollers are then caused to bear against the projecting edge of the bottom, turning it over onto the flange at the base of the can-body, thus seaming the two together. Then a pair of rollers are caused to bear upon the upper edge of the can-body and traveling around the same curl that upper edge inward to give it the form known as "false wiring." Then the plunger recedes from the can-body, and a cover rolling down an incline is turned over into the grasp of a pair of fingers, which center it directly over the can-body, whereupon the plunger comes downward, forcing the cover onto the can-body. The completed and covered can now comes into position where it leaves the machine, and material for a new can is inserted in its place.

Figure 2:
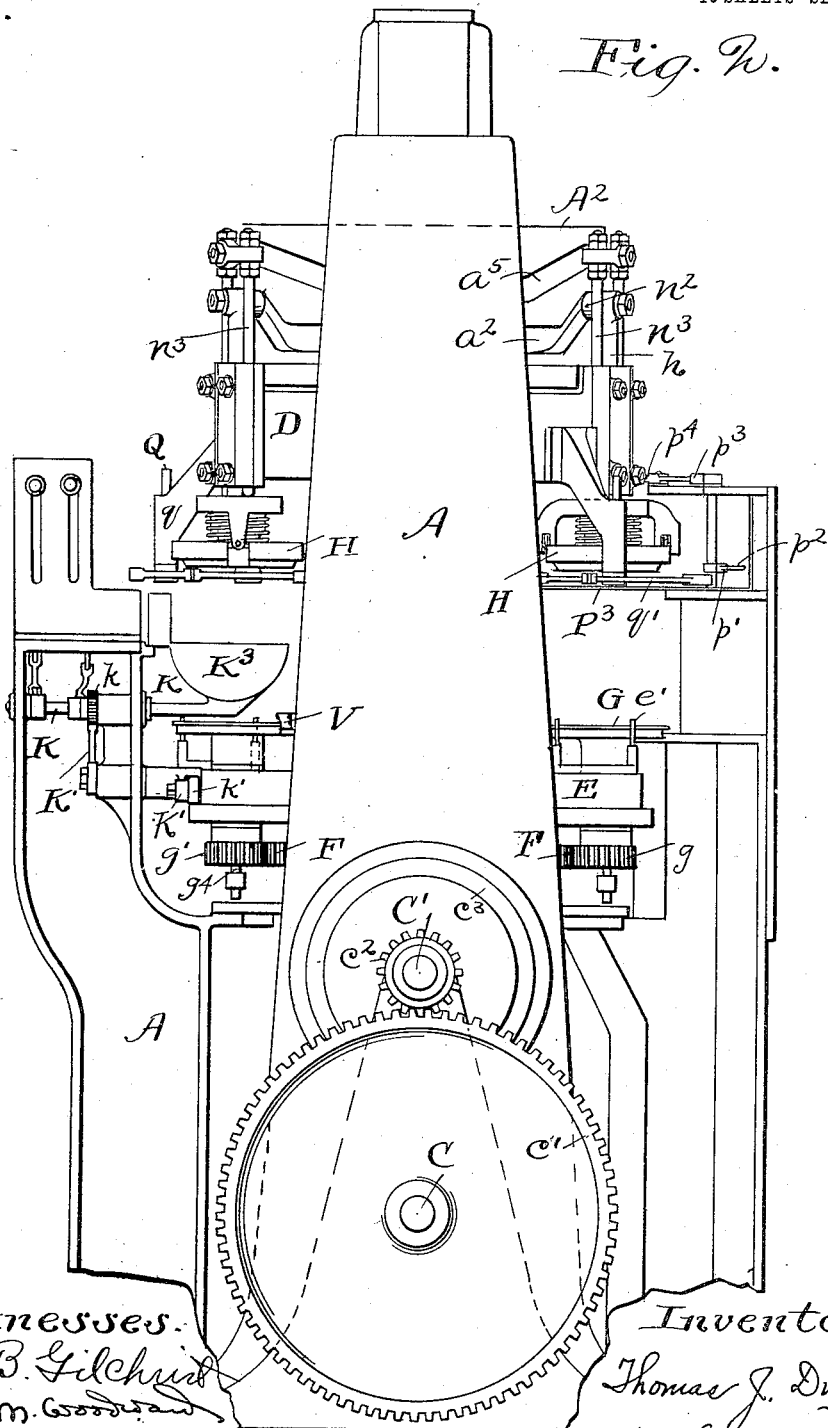
Figure 3:
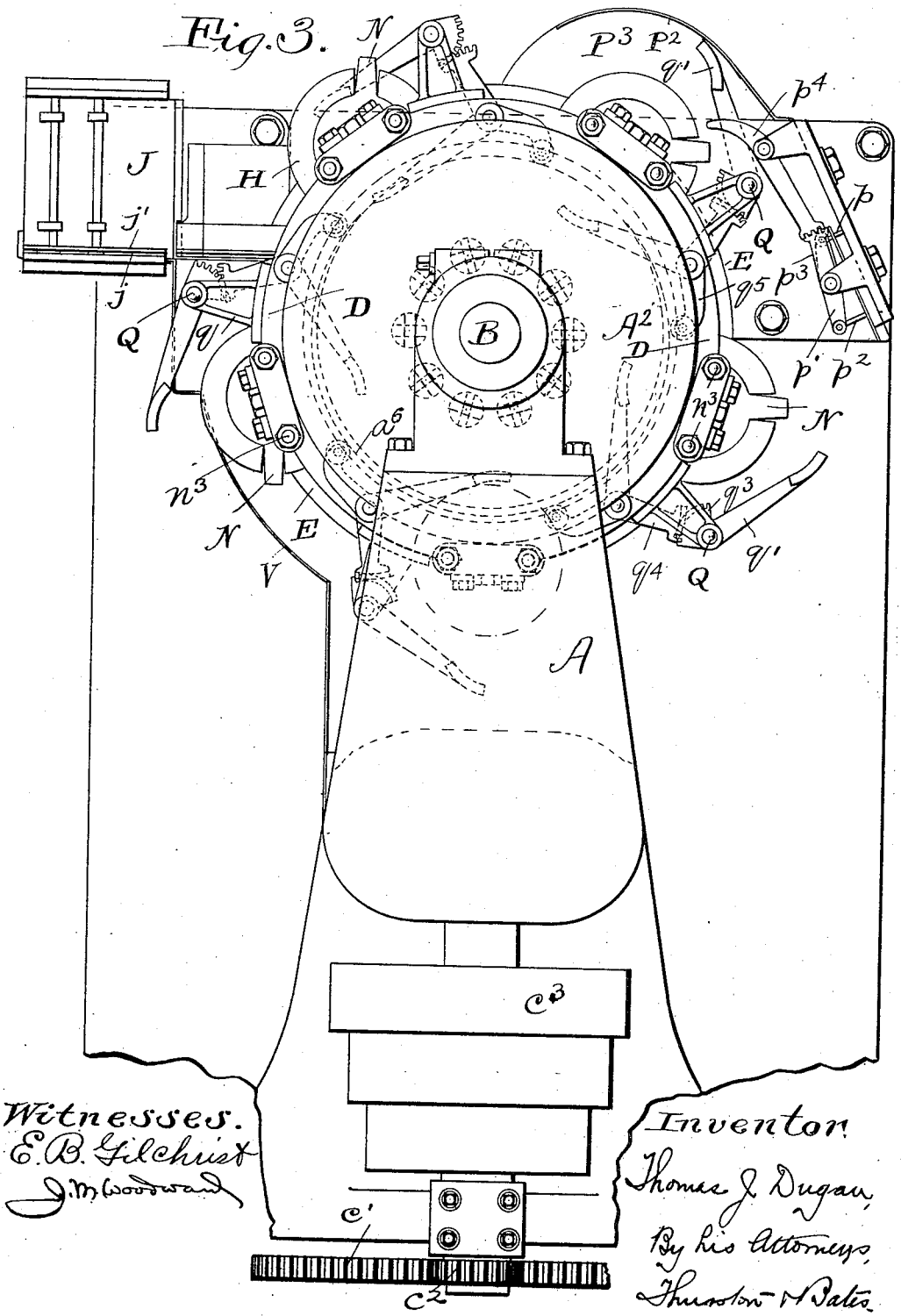
Figure 4:
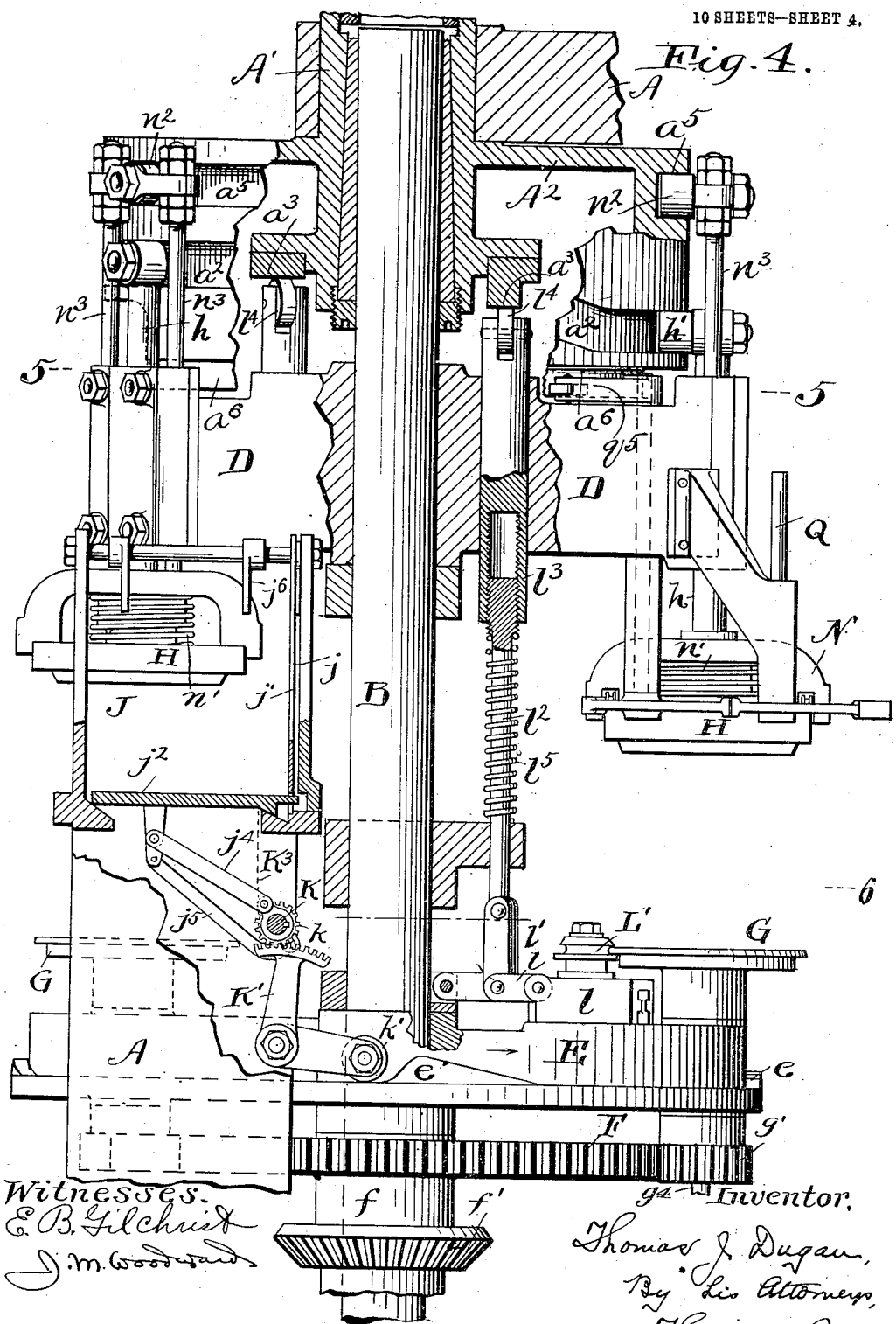
Figure 5:
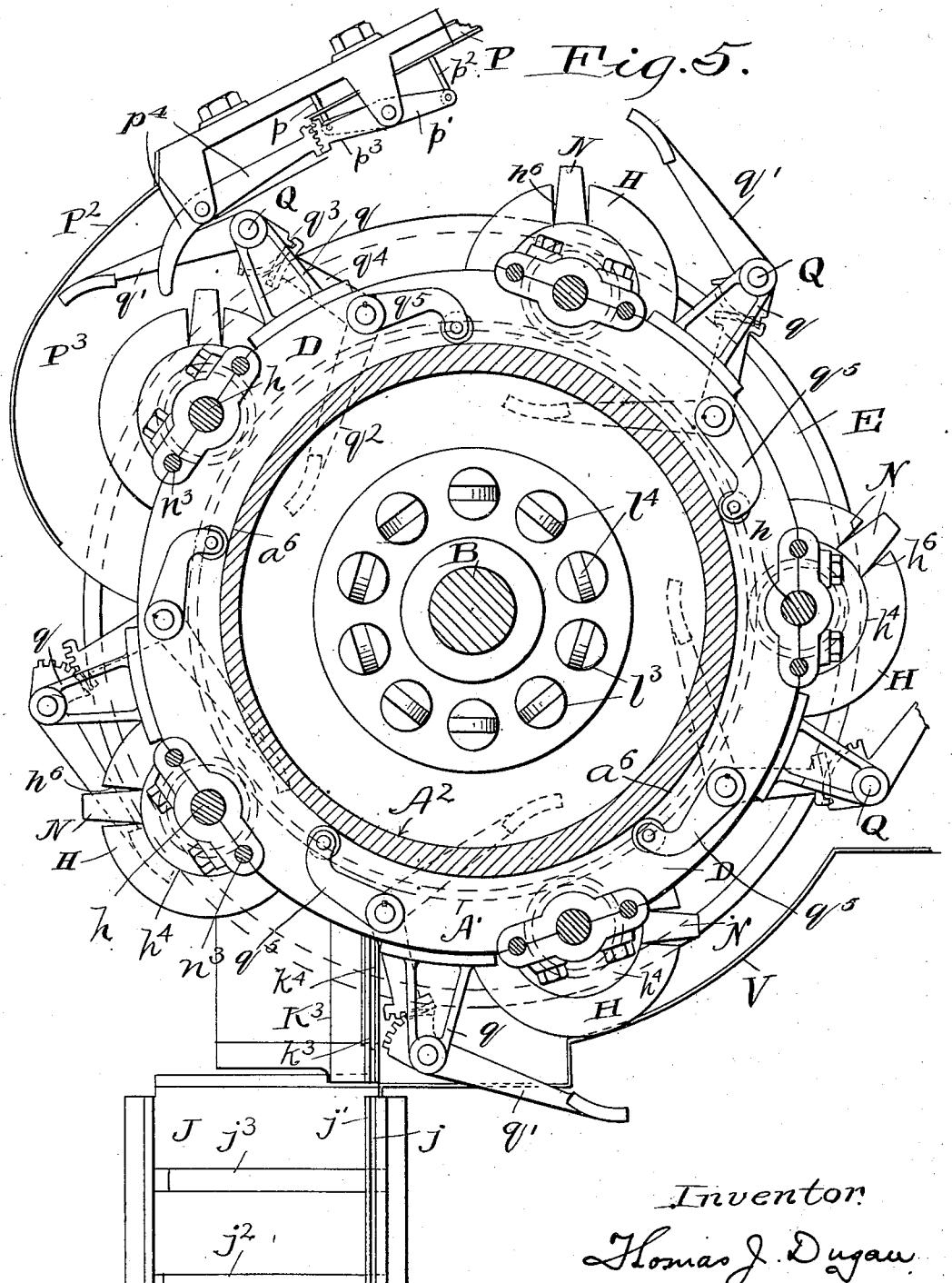
Figure 6:
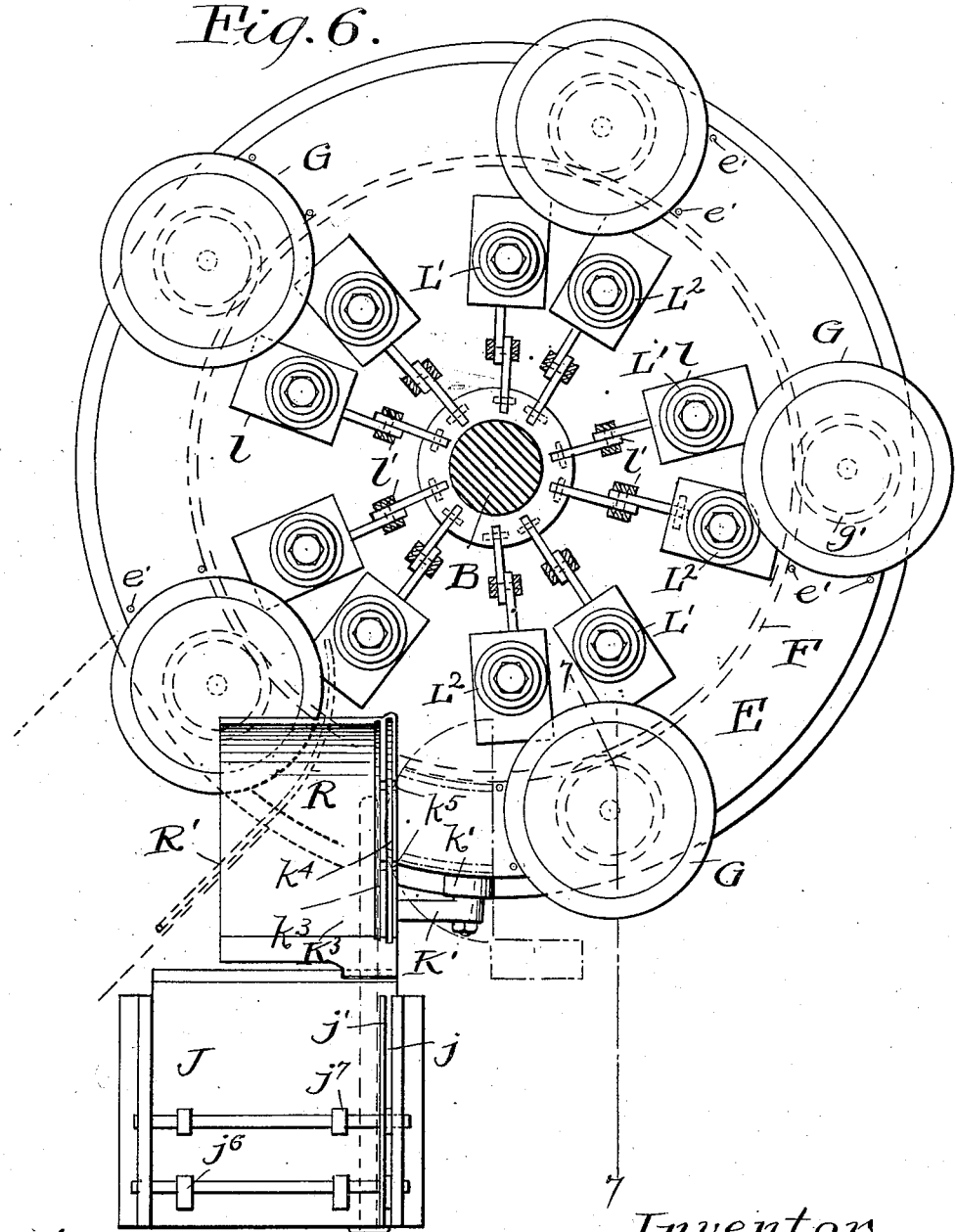
Figure 7:
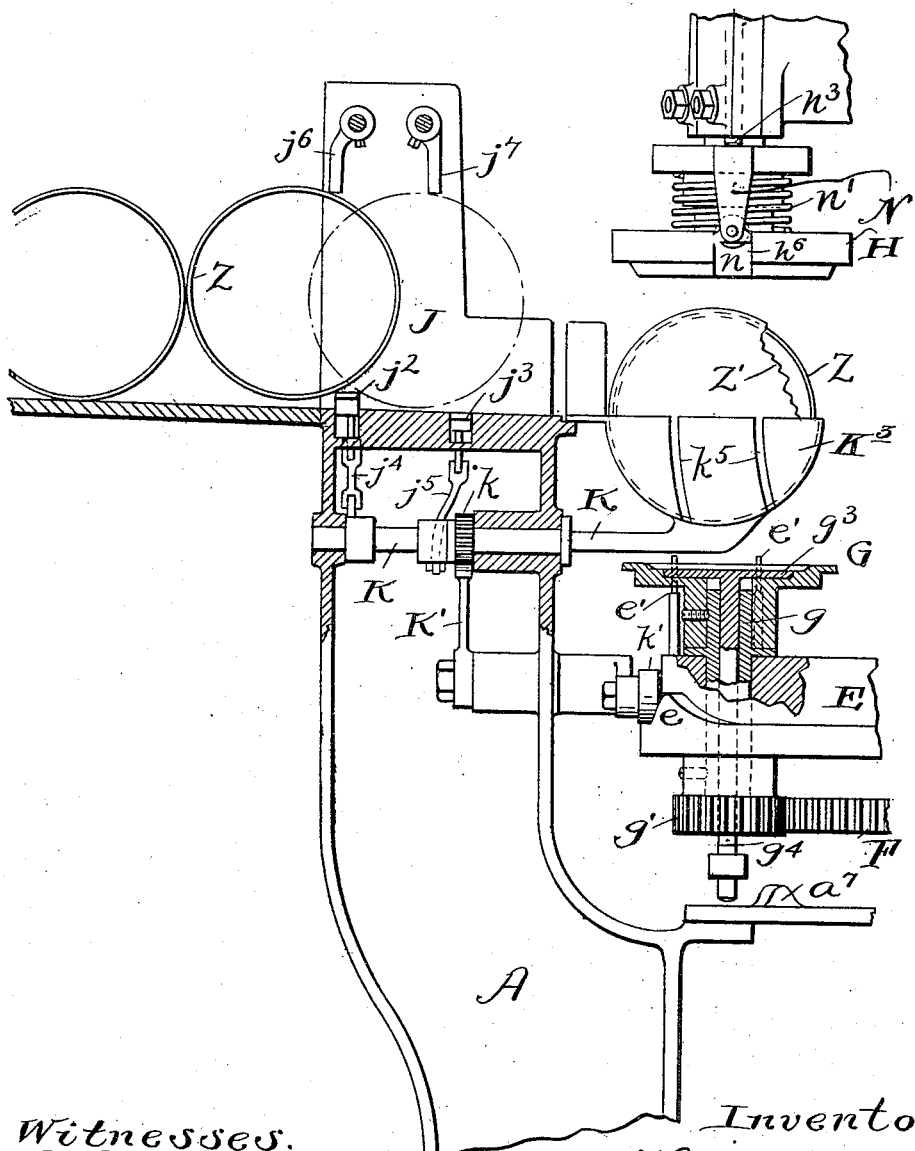
Figure 8:
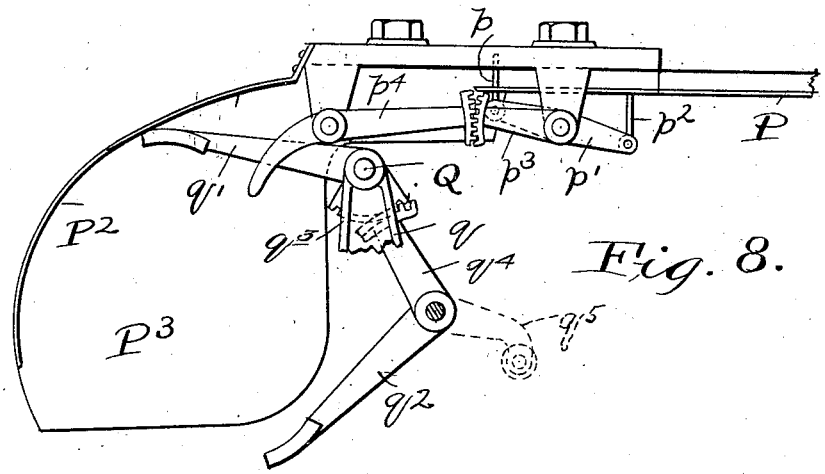
Figure 9:
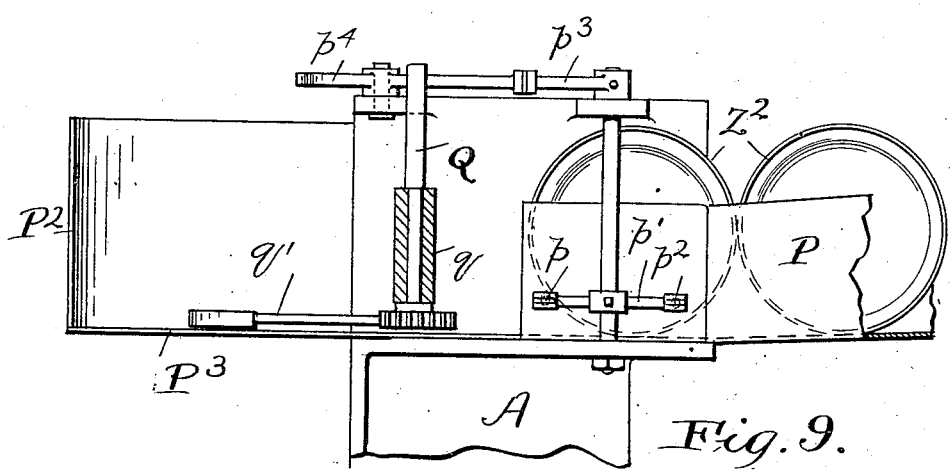
Figure 10:
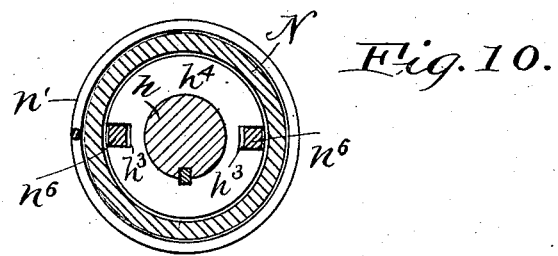
Figure 11:
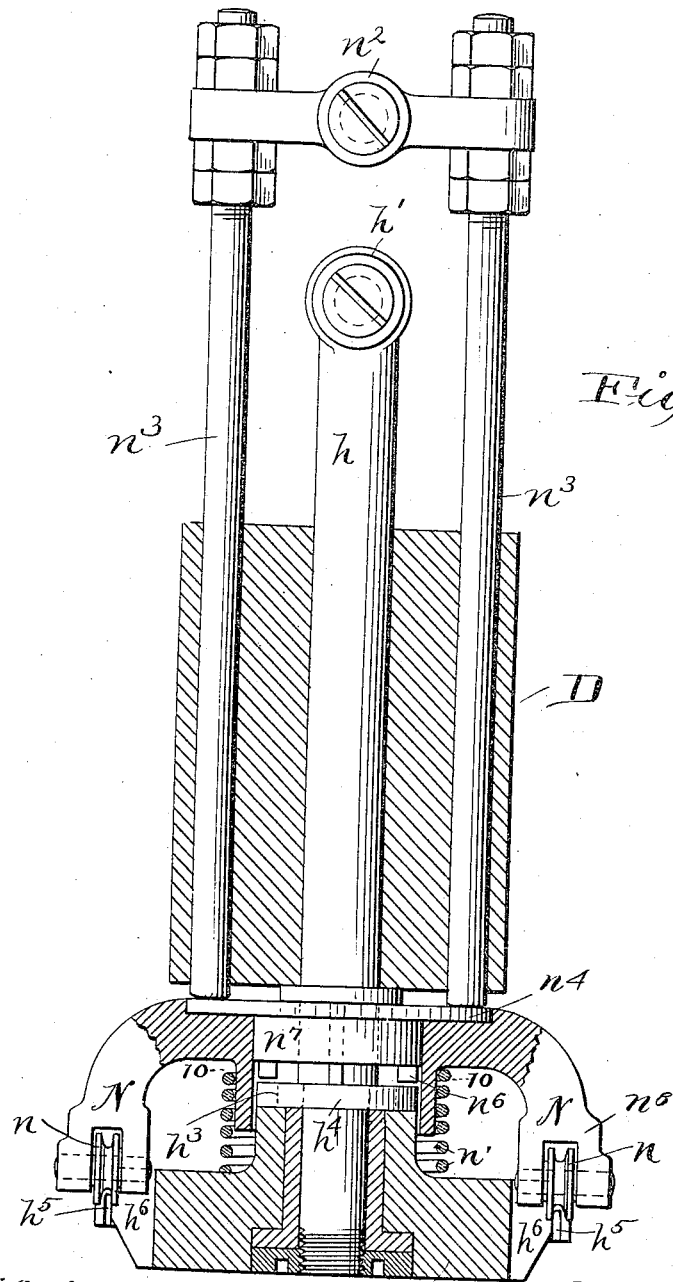
Figure 12:
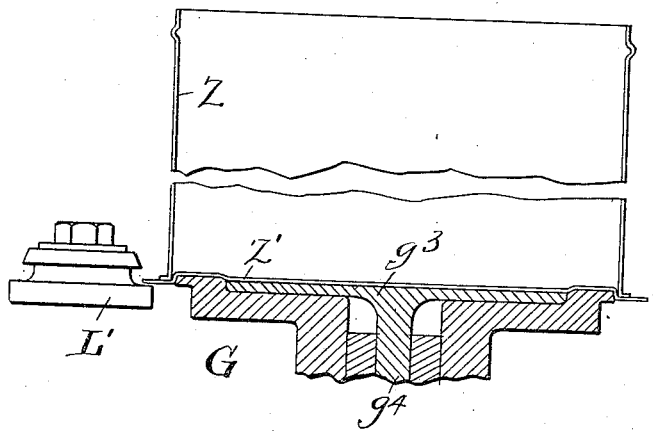
Figure 13:
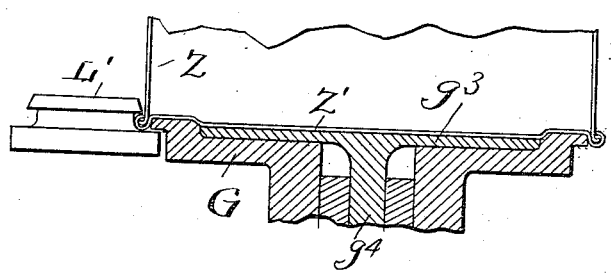
Figure 14:
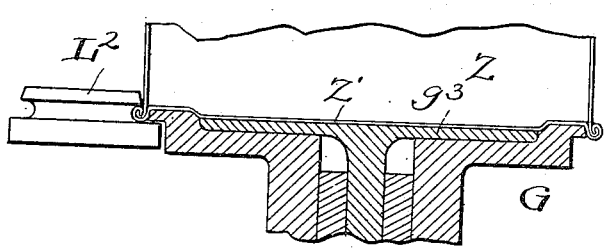
Figure 15:
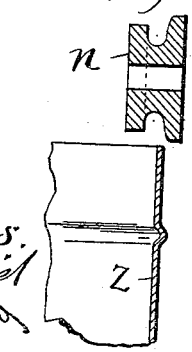
Figure 16:
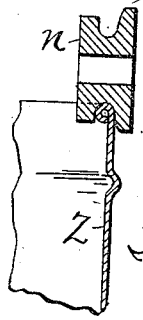

In the drawings, which illustrate the preferred form above referred to, Figure 1 is a side elevation of the machine. Fig. 2 is a rear view thereof. Fig. 3 is a plan. Fig. 4 is a vertical section in a plane parallel with Fig. 1. Fig. 5 is a horizontal section on the line 5 5 of Figs. 1 and 4. Fig. 6 is a plan view of the mechanism for feeding the cans to the several chucks and is a sectional plan of the rest of the machine in the plane indicated by line 6 on Fig. 4. Fig. 7 is a vertical section on the line 7 7 of Fig. 6. Fig. 8 is a detached view in plan of the cover-feeding mechanism. Fig. 9 is a sectional elevation of such mechanism. Fig. 10 is a detail in horizontal section on the line 10 10 of Fig. 11. Fig. 11 is a vertical section through the mechanism for giving the can its false wiring. Figs. 12 to 16, inclusive, are in the nature of diagrams showing the can at its various stages through the machine. Fig. 12 shows the body and bottom placed together ready for operation; Fig. 13, the first operation in seaming the body and bottom together; Fig. 14, the final seaming operation. Figs. 15 and 16 illustrate the can before and after the false wiring.

Referring by means of reference-letters to the embodiment of the invention shown in the drawings, A represents a suitable frame-standard. Journaled vertically in this standard is the main shaft B, which carries much of the mechanism and is continuously rotated by means of a horizontal shaft C, which is geared with it by beveled gears $b$ and $c$. Gears $c'$ and $c''$ connect this shaft with the driving-shaft C', which carries a usual stepped belt-pulley $c^3$.

Rigidly secured to the shaft B, so as to rotate with it, are two horizontal supporting members D and E, which carry, respectively, the upper and lower devices for holding and rotating the can during its various operations. The lower holding-chuck is designated G and the upper H. The drawings show five of these holding means, wherefore five cans are being operated on simultaneously in their various stages of completion. The cans travel continuously from the receiving-point to the discharge-point, and during that travel the bottom is seamed onto the body, the false wiring formed at the top of the body, and the cover placed on the can.

The first operation in natural sequence is the feeding of the can bodies and bottoms to the machine. This will now be described. The can-bodies lie on their cylindrical sides in a chute J, Figs. 3 to 7, which is inclined slightly, so that they will roll by gravity toward the machine. At the side of this chute is a channel $j$, separated by a partition $j'$. This channel is occupied by the bottoms resting on their peripheries and also tending to roll toward the machine.

The bodies and bottoms are held from rolling into the machine by stop-bars $j^2$ $j^3$, extending across them and occupying recesses within the base of the chute. As shown in Fig. 4, these stop-bars have an inclined support, so that if they are moved longitudinally they will be raised or lowered. The stop-bars are connected by links $j^4$ $j^5$ with a rock-shaft K. This rock-shaft carries a pinion $k$, with which meshes the segment-arm K′, carrying a roller $k'$, adapted to be engaged by one of a series of cams $e$ on the rotating member E. When one of the cams engages this roller, it rocks the shaft K, drawing down the stop-bar $j^2$ and elevating the bar $j^3$. This allows a can body and bottom to roll from the position shown in full lines in Fig. 7 between the stop-bar $j^2$ and the fingers $j^6$ into position between the stop-bar $j^3$ and the fingers $j^7$, as shown in dotted lines. Then as the cam $e$ clears the roller $k'$ the shaft K is rocked in the opposite direction, and the stop-bar $j^2$ is again elevated to block the advance of other cans, and the stop-bar $j^3$ is depressed to allow the forward can body and bottom to roll into the machine.

To receive the can body and bottom, (designated Z and Z′, respectively,) as they come into the machine, I provide a short semicylindrical sleeve K³, mounted on the shaft K. This sleeve has a groove $k^3$ to receive the outward flange at the base of the can-body and grasp the body sufficiently to hold it as it is being turned into position. The sleeve K³ also has a separate compartment $k^4$ to receive the bottom of the can. As soon as the body and bottom have rolled into this receiving-sleeve the shaft K makes its return movement, which, as has been described, elevates the stop-bar $j^2$. This same return movement, which is a quarter of a rotation, turns the receiving member $k^3$, with the can which has just rolled into it, upward to bring the bottom into a horizontal position with the body directly above it. It will be seen that when the bar $j^3$ is up to block the cans the receiving member is also up to hold the previously-received can in upright position. After that can has been removed from the receiving member, as about to be described, the return movement of the receiving member into the position shown in Fig. 7 draws downward the bar $j^3$, as shown in that figure, so that the foremost can may roll into the receiving member, the subsequent cans being blocked by the bar $j^2$. As soon as the foremost can has reached the receiving member the succeeding cam $e$ engages the roller $k'$ and again rocks the receiving member upward to turn the can body and bottom into upright position.

When the can body and bottom have been turned into active position, as above described, they stand just in front of a pair of pins $e'$, carried by the member E. Thereupon these pins, traveling through slots $k^5$ in the bottom of the receiving member K³ and engaging the can bottom and body, shove the same out of the receiving member, whereupon they drop onto the lower chuck member G, the receiving member thereafter swinging back for fresh material, as above described.

The chuck G includes a circular plate of substantially the diameter of a finished can and secured to a sleeve $g$, journaled in the frame member E. On the lower end of this sleeve is a pinion $g'$, which is constantly in mesh with a large gear F, which is carried by a sleeve $f$, journaled on the shaft B. This sleeve carries a bevel-gear $f'$, meshing with a bevel-gear $c^4$ on the forward end of the main driving-shaft C′. The gear $f$ is thus rotated in the opposite direction to the support E and preferably at an increased speed. These opposite rotations give to each chuck a rotation about its own axis.

As soon as the can-body is turned into upright position, as stated, the upper chuck H comes down on top of the can-body, holding it until the bottom is rightly centered on the chuck. As soon as the can body and bottom have been moved out of the receiving member a slight further descent of the head H holds the can firmly on the bottom, the upper edge of the body occupying the annular groove $h^5$ in the head H. A stationary guard V prevents parts becoming displaced before they are tightly clamped by the head and chuck. This upper chuck is rotatably mounted on the lower end of a rod $h$, which is slidable in the member D and carries a roller $h'$, taking into a cam-groove $a^2$ in the stationary cam member A². This cam member has an upwardly-extending sleeve A′, by which it is secured to the frame A, and which carries the upper bearing for the shaft B. It is the action of the cam-groove $a^2$ that brings the head H down on the can-body. As soon as the head has engaged the can-body the latter is firmly held on the bottom, resting on the chuck G. It is thus in position to have the bottom seamed onto the body. This position is illustrated in Fig. 12.

The seaming of the bottom onto the body is accomplished by the successive action of a pair of forming-rollers L' and L², which are rotatably mounted, respectively, on vertical pins carried by slidable blocks $l$, which are connected by toggle-links $l'$ with vertical rods $l^2$, extensions $l^3$ of which carry rollers $l^4$, engaging the under side of a stationary cam $a^3$, carried by the stationary member A². As soon as the can-body is firmly seated and held on the bottom the corresponding roller $l^4$ engages the cam $a^3$, forcing the forming-roller L' against the projecting periphery of the can-bottom, turning it partially over onto the base-flange of the body, as shown in Fig. 13. Thereafter another forming-roller L², associated with the rotating chuck which is grasping the can whose bottom is being seamed thereto, is moved so that it will come into engagement with the partially-completed seam, and thereby roll it up more tightly and complete it. The block carrying this seaming-roller L² is moved backward or forward by mechanism which is precisely like that which has been heretofore explained for moving that block which carries the seaming-roller L'. Fig. 12 shows the condition of the edge of the bottom and of the flange on the body before either seaming-roll has acted upon them. Fig. 13 shows the condition of said parts after the roller L' has done its work, and Fig. 14 shows the seam after it has been completed by the action of the roller L². At the conclusion of the operation of these forming-rollers they are retracted by the springs $l^5$, which elevate the rods $l^2$. The extension $l^3$ of the rod $l^2$ is screw-threaded to it in order to provide a convenient adjustment.

After the bottom has been seamed onto the body the forming-rollers corresponding to that can are idle for the rest of the rotation of the shaft B. The next operation which takes place is the false wiring, which consists in curling over inwardly the upper edge of the body. The construction of the mechanism for this purpose, now to be described, is shown in Figs. 7, 10, and 11. Embracing rod $h$ above the rotatable chuck member H is a collar $n^7$, which has a tongue-and-groove connection with rod $h$, by reason of which it may be moved vertically thereon but cannot turn. The yoke-piece N is rotatably mounted upon this collar $n^7$ below a plate $n^4$, which extends as a flange outward from the collar $n^7$. The yoke-piece has depending arms $n^8$, whose lower ends enter notches $h^6$ in the edges of the chuck member H, wherefore under normal conditions the yoke-piece N rotates with the chuck member H. A spring $n'$ acts to thrust the yoke-piece N upward, whereby the collar $n^7$ is also moved upward. On the under side of the collar $n^7$ are the downwardly-projecting fingers $n^6$, which are normally above but are adapted to enter recesses $h^3$ in a disk or collar $h^4$, which is rigid with chuck-head H. Two vertically-movable rods $n^3$, suitably guided by a portion of the machine-frame, are connected at their upper ends by a cross-bar which carries a roller $n^2$. This roller engages in a cam-groove $a^5$ in the non-rotatable member A². The lower ends of these bars $n^3$ rest upon the flange or plate $n^4$. Now when the forming-rollers L' L² have finished their work the cam $a^5$, by its action on the roller $n^2$, thereby moves bars $n^3$ downward, and they in turn push the yoke-piece N downward, so that the forming-rollers $m$, carried thereon, will come into contact with the top edge of the can. When this yoke-piece so moves down, the fingers $n^6$ will enter the holes $h^3$, and thereby the yoke-piece will be caused to discontinue its revolution. Because the can is still revolved the top edge of the can will be carried around in contact with said rollers and will be curled inward—that is to say, it will be false-wired. The downward movement of the yoke-piece N is accompanied by a suitable upward movement of the chuck member H, due to the form of the cam with which the roller $h'$ engages, to permit the top of the can to be so false-wired.

The foregoing operations have completed the can, and the next operation is to place the cover on it. The covers lie on edge in a suitable chute P, Figs. 5 and 8. This chute is inclined sufficiently to cause the covers to roll toward the machine. The covers are normally stopped by a pin $p$, carried at one end of an intermediately-pivoted lever $p'$. The other end of this lever has a stop-pin $p^2$. The lever is connected with a segment-arm $p^3$, which engages with teeth on a trip-lever $p^4$. When the forward end of this lever is engaged, the lever $p'$ is rocked, withdrawing the pin $p$ to release the forward cover and projecting the pin $p^2$ into the path of the succeeding cover. Then as the lever rocks back the pin $p^2$ withdraws and the foremost cover remaining in the chute comes against the pin $p$ ready for subsequent action. The cover is released, as above described, by the engagement of the forward end of the trip-lever $p^4$ by an upwardly-projecting shaft Q, journaled in brackets $q$, carried by the rotating member D. When the cover is thus released, it rolls forward along the inner side of the curved vertical guard-plate P² and falls over an arm $q'$ at the base of the support P³ into horizontal position between that arm and another arm $q^2$, journaled on the frame member D. These two arms $q'$ and $q^2$ are connected together by meshing segment-arms $q^3$ and $q^4$ and are operated by an arm $q^5$, which carries a roller engaging the peripheral cam-surface $a^6$ of the stationary cam A². This cam-surface is formed to cause the arms $q'$ and $q^2$ to approach each other as soon as the cover is between them, thereby grasping that cover and centering it over the can-body. As soon as the cover is centered over the can-body the head H, which was elevated to allow the cover to turn into place, is again depressed by the action of the cam-groove $a^2$. This depression operates to force the cover onto the can-body.

The can is now completed and covered, and it only remains to discharge it. This is accomplished by the head H again rising under the action of the cam-grooves $a^2$ and $a^5$ and the plate $g^3$ in the center of the disk G of the lower chuck being elevated to force the can off this chuck. This elevation is caused by a central rod $q^4$, Fig. 7, which carries the plate, engaging at its lower end with a stationary cam $a^7$, carried by the frame. This operation loosens the completed can and elevates it sufficiently so that the pins $e'$ may pass beneath it. At the same time the body engages the stationary discharge-plate R, and by reason of such engagement and continued travel of the support the can is caused to slide out onto the discharge-table R'.

It will be seen from the above description that the machine is entirely automatic, its material being fed by gravity and the complete product being automatically delivered. The feeding-chutes and the discharge-table being stationary, the original reception of the can members and the cover in the machine as well as the discharge from the machine take place at definite points, but without diminution in the speed of travel of the machine. The operations of seaming, false wiring, and forcing the cover onto the can-body take place not at single points, but during different portions of the travel of the parts. This allows the operation to be continuous and extremely rapid. The speed of rotation is not varied or interrupted, and no time is lost, such as would be the case if the can parts were simply successively brought to stationary positions at which the different operations were performed.

I claim—

1. In a can-making machine, the combination of an inclined chute adapted to convey to the machine can bodies and bottoms, a rotatable and bodily-traveling chuck adapted to receive the can body and bottom, and a seaming-roller adapted to act on such parts while the chuck is traveling.

2. In a can-making machine, the combination of a rotatable support, a series of chucks carried thereby, means for forming a seam on materials carried on one of the chucks, and means for false-wiring material carried by another chuck, said operations being performed simultaneously while the support is rotating.

3. The combination of a rotatable support, a chuck consisting of two members rotatably mounted upon said support in axial alinement, means for rotating one of said chuck members, means for moving the chuck members relatively toward and from each other to grasp and release a can-body, a seaming-roller movably mounted upon the support, and mechanism for moving it into and out of engagement with a can-body held between said chuck members while both the chuck and support are rotating.

4. The combination of a rotatable support, a series of chucks each consisting of two members rotatably mounted upon said support in axial alinement, means for rotating one member of each pair of chuck members while the support travels, forming-rollers which are severally associated with each chuck and are mounted upon the rotatable support, and mechanism for automatically moving said rollers into operative engagement with the can-bodies severally held in the chucks, and for holding them in engagement therewith during a portion only of the rotation of the support.

5. The combination of two supporting members rotatable simultaneously upon the same vertical axis, a series of lower chucks rotatably mounted upon the lower supporting member on vertical axes, a corresponding series of upper chucks rotatably mounted upon the upper supporting member, the corresponding chucks of the two series being adapted to engage the cans between them, a false-wiring device associated with each chuck, and means for bringing the same into action at a certain period of the rotation of the two supports.

6. In a can-making machine, the combination of means for feeding the can bodies and bottoms to the machine, mechanism for then seaming the same together, mechanism for then curling over the top of the body, and mechanism for then placing a cover on the can.

7. The combination of a rotatable horizontal support, a series of chucks mounted thereon, and rotatable on vertical axes, an inclined chute for the can bodies and bottoms, a receiving member adapted to receive cans and bodies discharged from said chute and adapted also to turn upon a horizontal axis, mechanism for then moving said body and bottom out of said receiving member onto an adjacent chuck.

8. The combination of a series of chucks, a chute for the can bodies and bottoms, a receiving member adapted to receive the same, mechanism for causing said member to turn the body and bottom onto an adjacent chuck, and a stop in the chute operating correspondingly with said receiving member.

9. In a can-forming machine, the combination of a rotatable support, mechanism thereon for carrying a can body and bottom, means for feeding the can body and bottom to such mechanism, and a stationary guard for holding the can body and bottom in place on such mechanism.

10. The combination of a rotatable support, a series of individual chucks carried thereby, forming-rollers carried by the support and movable toward the chucks, mechanism for so moving them, and a stationary cam for operating such mechanism.

11. The combination of a support, a chuck individually journaled in the support, means for rotating the support and for individually rotating the chuck, a forming-roller carried by the support and shiftable toward the chuck, mechanism for so shifting it while the support is traveling and the chuck rotating.

12. The combination of a rotatable support, a series of chucks journaled therein and individually rotatable, a series of forming-rollers, a slide for each roller, toggle-links for forcing said slides toward the chucks, a series of rods connected with said toggle-links, and a stationary cam adapted to operate said rods.

13. In a can-making machine, the combination of an upper and lower rotatable support, individually-rotatable chucks mounted in said lower support, heads carried by the upper support above the chucks, said heads being slidable toward and from the chucks, a roller carried adjacent to each head and traveling with it and the supports, and means for moving such roller toward the can independently of the head.

14. In a can-forming machine, the combination of a rotatable chuck adapted to carry the lower end of the can, a rotatable head to engage the upper end of the can, a forming-roller carried adjacent to said head and movable with the head as it rotates, means for pressing such roller against the upper end of the can while the can is rotating, and a clutch for holding this head stationary at such time.

15. In a can-making machine, the combination of an upper and lower rotatable support, individually-rotatable chucks mounted in said lower support, heads carried by the upper support above the chucks, said heads being slidable toward and from the chuck, wiring-rollers, a yoke carrying such rollers, a plunger for depressing the same, a stationary cam having two peripheral grooves, and rollers in said grooves connected respectively with the support for said head and with said plunger.

16. In a can-making machine, the combination of a rotatable chuck adapted to support the can-bottom and a surmounted body, means for seaming the two together while on such chuck, a discharge-plate carried by the chuck, and means for forcing it toward the can to force the same off of the chuck.

17. In a can-making machine, the combination of means for feeding to the machine can bodies and bottoms, traveling means for carrying such parts in the machine, mechanism acting on such parts while they are traveling to seam them together, and mechanism subsequently acting upon the can-body while it is traveling to curl its upper edge.

18. In a can-making machine, the combination of means for feeding to the machine can bodies and bottoms, traveling means for carrying such parts in the machine, mechanism acting on such parts while they are traveling to seam them together, means for feeding can-covers to the machine, and mechanism for placing the same on the traveling can after the can bodies and bottoms have been seamed together.

19. In a can-making machine, the combination of means for automatically supplying the machine with can bodies and bottoms, means for causing the same to travel through the machine, means for seaming the same together during such traveling, means for thereafter curling the upper edge of the can during such traveling, means for feeding can-covers to the machine, means for placing the same on the can during its travel in the machine, and means for finally discharging the completed can.

In testimony whereof I hereunto affix my signature in the presence of two witnesses.

THOMAS J. DUGAN.

Witnesses:
ALBERT H. BATES,
J. M. WOODWARD.